UNITED STATES PATENT OFFICE.

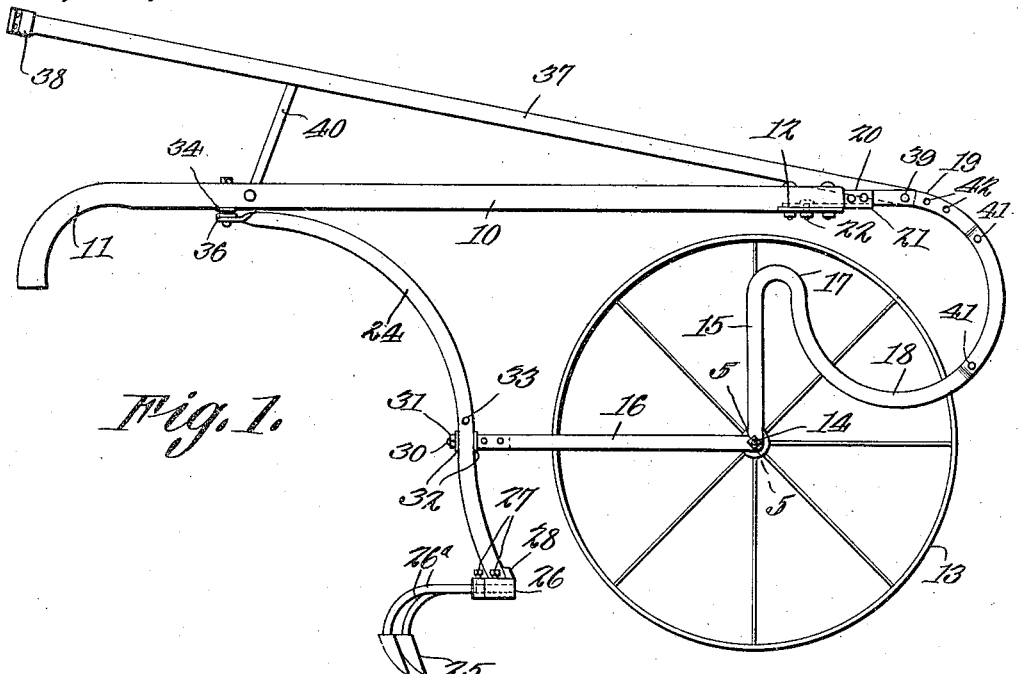

JOSEPH MAURICE HARTMAN, OF YARDLEY, PENNSYLVANIA.

WHEEL-HOE.

1,244,850.   Specification of Letters Patent.   Patented Oct. 30, 1917.

Application filed July 26, 1916. Serial No. 111,369.

*To all whom it may concern:*

Be it known that I, JOSEPH MAURICE HARTMAN, a citizen of the United States, residing at Yardley, in the county of Bucks and State of Pennsylvania, have invented certain new and useful Improvements in Wheel-Hoes, of which the following is a specification.

This invention relates to cultivators and similar earth-working implements which are wheel-supported and adapted to be operated manually.

The invention has for its object to provide a novel and improved implement of the kind stated, in which the cultivator shovels or other earth-working elements may be shifted laterally to run a straight furrow.

Other objects and advantages of the invention will be pointed out in the detailed description appearing hereinafter, and in order that the same may be better understood, reference is had to the accompanying drawing.

In the drawing,

Figure 1 is a side elevation of the implement;

Fig. 2 is a plan view thereof;

Fig. 3 is a rear elevation, partly in section;

Fig. 4 is a detail in perspective;

Fig. 5 is a cross-section through the hub of the wheel, and

Figs. 6 and 7 are details in perspective.

Referring specifically to the drawings, 10 denotes a pair of laterally spaced, horizontal handle bars having hand grips 11 at their rear ends, and converging in the direction of their forward ends, where they are connected by a plate 12 extending transversely therebetween. The implement has one ground wheel 13 which is loose on an axle 14 extending between and secured to two laterally spaced and parallel frame bars. Each of these bars comprises a vertical portion rising a suitable distance from the axle 14, and having forwardly and rearwardly extending portions, the latter being horizontal and shown at 16. The axle 14 is carried by the frame bars at the angle of the parts 15 and 16. The forwardly extending portion of each frame bar is had by a forward and downward curve 17 at the top of the part 15, after which a wide forward bend or curve upward is made, as shown at 18, the latter terminating in a rearward curve 19 at the level of the handle bars 10. The parts 15, 16, 17 and 18 are below the handle bars 10, and they terminate in advance of the forward ends thereof, with the part 19 extending rearward to meet said ends of the handle bars. The extremity of the parts 19 of the frame bars has a loose connection with the plate 12, said parts 19 being fastened to the upstanding side flanges 20 of a plate 21 slidably seating on top of the plate 12. The connection between the plates 12 and 21 is made by a bolt 22 passing therethrough, the plate 12 having a longitudinal slot 23 to receive the bolt, whereby a sliding connection between the frame bars and the plate 12 is had.

The handle bars 10 carry depending hanger bars 24 for supporting the earth-working elements, the same being cultivator shovels 25. Of course, it will be understood, that plowshares, harrow teeth or other elements may be substituted for the cultivator shovels. The hanger bars and the parts carried thereby are located to the rear of the wheel 13.

The hanger bars 24 extend convergingly downward to the level of the frame parts 16, and then extend downward in parallelism and in contact with each other, their lower ends carrying a bracket member 20 which supports the beams or shanks 26ᵃ of the shovels 25. The bracket member is in the form of an elongated bar extending transversely of the hanger, and having apertures to receive the shanks 26ᵃ, the latter being held fixed in the apertures by set screws 27. In the top of the bar 26 is a socket 27ᵃ in which the bottom of the hanger seats, the front edge of the bar having an upstanding lug 28 engaging the front edge of the hanger. The shank 26ᵃ, midway between the ends of the member 26, passes through the socket 27ᵃ and through the bend or loop connecting the lower ends of the two bars 24 forming the hanger, whereby a pivotal connection is had between the member 26 and the hanger.

A pivotal connection is also made between the hanger 24 and the rear ends of the parts 16 of the frame bars. These ends of the frame bars are secured to a block 29 fitting therebetween, and having a rearwardly extending threaded shank 30 which lies between the hanger bars 24 and projects from the rear edges thereof, with a nut 31 screwed on its projecting end, and washers 32 on the edges of the hanger bars. A short distance above the shank 30, the hanger bars are connected by a cross bolt 33.

The bars 24 are not connected directly to the handle bars 10, the latter carrying a cross bar 34 to which is bolted, as shown at 35, a parallel cross bar 36 having fastened to its outer ends the upper ends of the bars 24, the latter being therefore free of the handle bars. The cross bar 34 is at the bottom of the handle bars and the cross bar 36 is beneath the cross bar 34.

The implement is also provided with a push bar 37 located above the handle bars, and having at its rear end a breast plate 38 provided with a strap 38ª against which the operator bears to propel the implement. The forward end of the push bar is pivotally connected to the parts 19 of the frame bars, as shown at 39, so that it may be swung forward and used as a tongue for pulling the implement.

To the handle bars 10 is pivoted a prop 40 engaging the push bar 37 and holding the same at the proper elevation.

Suitably positioned spacing bolts 41 hold the frame bars composed of the parts 15, 16, 17, 18 and 19 spaced apart.

A series of bolt holes 42 in the parts 19 of the frame bars provide for the adjustment of the push bar 37.

In operating cultivators of this type, furrows are sometimes encountered which were left by the harrowing or other operation and which are not parallel with the rows of plants to be cultivated. In this case, the handle bars 10 may be swung laterally to either side to cultivate close to the row of plants if the wheel 13 should happen to follow the furrow that is not parallel with the plant row, and the elements 25 can therefore be easily guided to run parallel to the plant row. The push bar 37 and the frame bars composed of the parts 15, 16, 17, 18 and 19 are rigid with respect to the wheel, as to a lateral movement, and as the pin 22 provides a pivotal connection between the handle bars and the rigid frame bars, the handle bars may be swung sidewise, which carries the hanger 24 in the same direction, the latter swinging about the stem 30. As the member 26 is pivoted to the hanger 24, it can tilt to retain its horizontal position as it is swung sidewise. The part 18 of the frame bars forms a spring bow, and said frame bars are therefore rendered resilient to absorb shocks and jars which would likely be imposed upon the handles and push-bar if not so constructed. The slot 23 permits the handle bars 10 to shift forward and rearward slightly to facilitate the longitudinal movement of the spring element as hereinbefore described.

I claim:

1. A soil-working implement comprising a wheeled frame, a push bar connected to the front portion thereof and extending rearward therefrom, handle bars rigidly connected together and loosely connected to the frame and free to swing sidewise simultaneously in the same direction, a hanger carried by the handle bars and pivotally connected intermediate its length to the frame, and earth-working elements carried by the lower end of said hanger.

2. A soil-working implement comprising a wheeled frame, a push bar connected to the front portion thereof and extending rearward therefrom, handle bars rigidly connected together and loosely connected to the frame and free to swing sidewise simultaneously in the same direction and also to move in the direction of their length upon said frame, and earth-working elements carried by the handle bars.

3. A soil-working implement comprising laterally spaced frame bars, a ground wheel carried by the frame bars, said bars extending forwardly and rearwardly from the wheel, and said forwardly extending portion having a spring loop, a push bar connected intermediate their length to the loop and extending rearwardly therefrom, handle bars rigidly connected together and loosely connected to the loop and free to swing sidewise, hangers carried by the handle bars and pivotally connected to the rearwardly extending portion of the frame bars, and earth-working elements carried by the hanger.

4. A soil-working implement comprising laterally spaced frame bars, a ground wheel carried by the frame bars, said bars extending forwardly and rearwardly from the wheel, and said forwardly extending portion having a spring loop, a push bar connected to the loop and extending rearwardly therefrom, handle bars loosely connected to the loop and free to swing sidewise and to move in the direction of their length, hangers carried by the handle bars and pivotally connected to the rearwardly extending portion of the frame bars, and earth-working elements carried by the hanger.

5. A soil-working implement comprising a wheeled frame, a push bar connected to the front portion thereof and extending rearward therefrom, handle bars rigidly connected together and loosely connected to the frame and free to swing sidewise simultaneously in the same direction, a hanger carried by the handle bars and pivotally connected intermediate its length to the frame, a bracket member extending transversely of the hanger and centrally pivoted thereto, and earth-working elements carried by said member.

6. A soil-working implement comprising a wheeled frame, a push bar connected to the front portion thereof and extending rearward therefrom, handle bars loosely connected to the frame and free to swing sidewise, a hanger carried by the handle bars and pivotally connected to the frame, a bracket member extending transversely of the hanger and having a top socket in which the lower extremity of the hanger seats, said hanger extremity having a loop, a shank passing through the bracket member and the loop, means for locking the shank in the member, and an earth-working element carried by the shank.

In testimony whereof I affix my signature in the presence of two witnesses.

JOSEPH MAURICE HARTMAN.

Witnesses:
E. WALTON BREWINGTON,
HOWARD D. ADAMS.

Copies of this patent may be obtained for five cents each, by addressing the "Commissioner of Patents, Washington, D. C."